(No Model.)

L. McCARTHY.
INSULATING COUPLING.

No. 468,772. Patented Feb. 9, 1892.

WITNESSES.
Robert Wallace,
A. H. Morrison

INVENTOR.
Louis McCarthy
by
Macleod Calver & Randall
attys.

UNITED STATES PATENT OFFICE.

LOUIS McCARTHY, OF BOSTON, MASSACHUSETTS.

INSULATING-COUPLING.

SPECIFICATION forming part of Letters Patent No. 468,772, dated February 9, 1892.

Application filed October 19, 1891. Serial No. 409,110. (No model.)

*To all whom it may concern:*

Be it known that I, LOUIS MCCARTHY, a citizen of the United States, residing at Boston, in the county of Suffolk and State of Massachusetts, have invented certain new and useful Improvements in Insulating-Couplings, of which the following is a specification, reference being had therein to the accompanying drawings.

My invention has for its object to produce a durable and efficient insulator for pipes; and it has particular reference to means for effecting the insulation of one portion of a gas-pipe from the other—as, for example, where it is desired to attach the pipe of a gasolier or electrolier to a fixed pipe.

My invention consists in the particular construction of insulating-couplings which is hereinafter set forth, and which is more particularly pointed out in the claims, which are appended hereto and made a part hereof.

Figure 1:
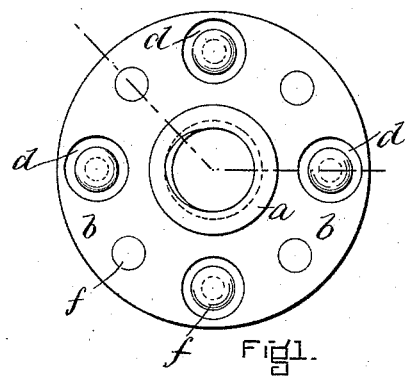
Figure 2:
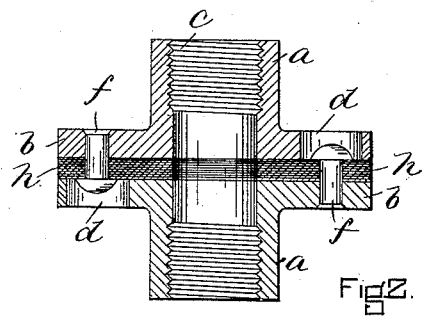

My invention is embodied in the insulating-coupling shown in the accompanying drawings, to which reference is made in the following description, and in which drawings Figure 1 is a plan view of the said insulating-coupling, and Fig. 2 a section on the line 2 2 of Fig. 1.

The metallic portions of the coupling consist of two short tubes *a*, which at their meeting ends are provided with annular flanges *b*. The tubes *a* are screw-threaded interiorly to permit them to be turned onto the screw-threaded ends of the pipes which are to be connected by the coupling. An insulating-layer *h* of sheet-mica is placed between the adjacent faces of the flanges *b*, and the parts of the coupling are secured together by headed bolts *f*. These bolts pass through holes in the mica and each bolt is riveted at one end in one or the other of the flanges *b*. Each flange *b* is formed with a series of holes *d* passing therethrough, such holes being of a diameter somewhat greater than that of the heads of the bolts *f*, in order that when the parts are secured together the bolts shall not come in contact with the portions of the flanges which surround the said holes. The holes for the reception of the riveted-down ends of the bolts alternate with the holes *d* in the said flanges. The layer of mica *h* is composed of one or more sheets which are cut to proper shape, and the said layer in addition to the holes made therein for the passage of the bolts has a central opening therethrough corresponding in size with the opening through the tubes *a* to permit of the passage of gas.

When the parts of the coupling are put together, the series of holes *d* in one flange *b*, alternate with the series of holes *d* in the other flange *b*, and the position of the bolts is alternated also, the heads thereof pointing in opposite directions alternately. Instead of the said heads taking bearing in the usual manner against the outer sides of the flanges, with or without insulating material interposed between the heads and the flanges, the said heads fit within the holes *d*, and the inner faces thereof bear against the layer of mica which lies between the flanges. The said layer thereby is made to serve the double function of insulating the parts of the coupling from each other and of contributing to securely hold the said parts together. The precise thickness of the mica layer *h* is not material so long as it possesses the required strength to prevent the metallic portions of the coupling from being broken apart. The precise number of bolts employed is not material so long as a sufficient number of bolts are used to firmly clamp and secure the parts of the coupling together. The alternating arrangement of the holes *d* and the heads of the bolts enables a large number of bolts to be used without a resulting weakening of either of the flanges *b*, and it also enables great strength to be attained. By employing a comparatively large number of bolts also a very tight joint may be obtained.

I claim as my invention—

1. An insulating-coupling for pipes, comprising two flanged tubes, a layer of insulating material placed between the flanges thereof, and a series of securing-bolts alternately set with reference to the said flanges and having their heads alternately engaging with the opposite sides of the said layer, substantially as set forth.

2. An insulating-coupling for pipes, comprising two flanged tubes, a layer of sheet-mica placed between the flanges thereof, and a series of securing-bolts alternately set with reference to the said flanges and having their heads alternately engaging with the opposite sides of the said layer, substantially as described.

3. An insulating-coupling for pipes, comprising two flanged tubes, a layer of insulating material placed between the flanges thereof, and alternately-set bolts having heads engaging with the opposite sides of the said layer, the said flanges having holes larger in diameter than the heads of the bolts and within which holes the said heads are received, substantially as described.

In testimony whereof I affix my signature in presence of two witnesses.

LOUIS McCARTHY.

Witnesses:
WM. A. MACLEOD,
ROBT. WALLACE.